US011757857B2

(12) United States Patent
Yamamoto et al.

(10) Patent No.: US 11,757,857 B2
(45) Date of Patent: Sep. 12, 2023

(54) DIGITAL CREDENTIAL ISSUING SYSTEM AND METHOD

(71) Applicant: NTT Research, Inc., Palo Alto, CA (US)

(72) Inventors: Go Yamamoto, Palo Alto, CA (US); Masahisa Kawashima, Palo Alto, CA (US)

(73) Assignee: NTT RESEARCH, INC., Sunnyvale, CA (US)

( * ) Notice: Subject to any disclaimer, the term of this patent is extended or adjusted under 35 U.S.C. 154(b) by 0 days.

(21) Appl. No.: 15/413,308

(22) Filed: Jan. 23, 2017

(65) Prior Publication Data

US 2018/0212941 A1 Jul. 26, 2018

(51) Int. Cl.
*H04L 9/40* (2022.01)
*H04L 9/32* (2006.01)

(52) U.S. Cl.
CPC .......... *H04L 63/062* (2013.01); *H04L 9/3268* (2013.01); *H04L 63/0442* (2013.01); *H04L 63/1458* (2013.01); *H04L 63/20* (2013.01); *H04L 2463/062* (2013.01)

(58) Field of Classification Search
CPC ............... H04L 63/062; H04L 63/0442; H04L 63/1458; H04L 63/30; H04L 9/0822; H04L 2463/062
USPC .......................................................... 726/6
See application file for complete search history.

(56) References Cited

U.S. PATENT DOCUMENTS

| 4,941,176 | A   | 7/1990  | Matyas et al.           |
|-----------|-----|---------|-------------------------|
| 6,575,902 | B1  | 6/2003  | Burton                  |
| 7,244,231 | B2  | 7/2007  | Dewing et al.           |
| 7,610,624 | B1  | 10/2009 | Brothers et al.         |
| 7,703,128 | B2* | 4/2010  | Cross ............ G06F 21/33 713/168 |
| 7,912,698 | B2  | 3/2011  | Statnikov et al.        |
| 8,135,718 | B1  | 3/2012  | Das et al.              |
| 8,418,249 | B1  | 4/2013  | Nuycci et al.           |
| 8,495,747 | B1  | 7/2013  | Nakawatase et al.       |
| 8,621,203 | B2  | 12/2013 | Ekberg et al.           |

(Continued)

FOREIGN PATENT DOCUMENTS

CN 104618377 A 5/2015
JP H11328593 A 11/1999

(Continued)

OTHER PUBLICATIONS

Horandner et al., 2016 11th International Conference on Availability, Reliability and Security, "Credential: A Framework for Privacy-Preserving Cloud-Based Data Sharing", pp. 742-749 (Year: 2016).*

(Continued)

*Primary Examiner* — Khalil Naghdali
(74) *Attorney, Agent, or Firm* — DLA Piper LLP US

(57) ABSTRACT

A digital credential issuing system and method use public storage and encryption to provide a more secure digital credential issuing process because there is no direct interaction between the credential issuer and an entity requesting a new credential. The new credential may be secured, such as by using encryption, so that the newly issued credential may be uploaded to the public storage and then decrypted and used by only the particular entity for which the new credential is intended.

20 Claims, 3 Drawing Sheets

(56) References Cited

U.S. PATENT DOCUMENTS

| | | | |
|---|---|---|---|
| 8,719,924 B1 | 5/2014 | Williamson et al. | |
| 8,726,379 B1 | 5/2014 | Stiansen et al. | |
| 8,762,298 B1 | 6/2014 | Ranjan et al. | |
| 8,806,647 B1 | 8/2014 | Daswani et al. | |
| 8,831,228 B1* | 9/2014 | Agrawal | H04L 9/0822 380/277 |
| 8,892,876 B1 | 11/2014 | Huang et al. | |
| 9,144,389 B2 | 9/2015 | Srinivasan et al. | |
| 9,183,387 B1 | 11/2015 | Altman et al. | |
| 9,258,321 B2 | 2/2016 | Amsler et al. | |
| 9,270,689 B1 | 2/2016 | Wang et al. | |
| 9,323,928 B2 | 4/2016 | Agarwal et al. | |
| 9,356,942 B1 | 5/2016 | Joffe | |
| 9,674,880 B1 | 6/2017 | Egner et al. | |
| 9,680,855 B2 | 6/2017 | Schultz et al. | |
| 9,716,728 B1* | 7/2017 | Tumulak | H04L 9/083 |
| 9,742,778 B2 | 8/2017 | O'Sullivan et al. | |
| 9,787,640 B1 | 10/2017 | Xie et al. | |
| 10,026,330 B2 | 7/2018 | Burford | |
| 10,038,723 B2* | 7/2018 | Gustafsson | H04L 63/10 |
| 10,104,097 B1 | 10/2018 | Yumer et al. | |
| 10,140,381 B2 | 11/2018 | Trikha et al. | |
| 10,268,820 B2 | 4/2019 | Okano et al. | |
| 10,326,744 B1* | 6/2019 | Nossik | H04L 9/0822 |
| 10,389,753 B2 | 8/2019 | Kawashima et al. | |
| 10,462,159 B2 | 10/2019 | Inoue et al. | |
| 10,566,084 B2 | 2/2020 | Kataoka | |
| 10,644,878 B2 | 5/2020 | Yamamoto | |
| 10,652,270 B1 | 5/2020 | Hu et al. | |
| 10,681,080 B1 | 6/2020 | Chen et al. | |
| 10,887,324 B2 | 1/2021 | Kataoka et al. | |
| 2002/0023059 A1* | 2/2002 | Bari | H04L 63/08 705/76 |
| 2002/0052858 A1 | 5/2002 | Goldman et al. | |
| 2002/0138492 A1 | 9/2002 | Kil | |
| 2003/0163684 A1* | 8/2003 | Fransdonk | H04L 63/0823 713/153 |
| 2003/0163686 A1* | 8/2003 | Ward | G06F 21/33 713/156 |
| 2003/0169185 A1 | 9/2003 | Taylor | |
| 2003/0188181 A1 | 10/2003 | Kunitz et al. | |
| 2004/0015579 A1* | 1/2004 | Cooper | H04L 41/046 709/223 |
| 2004/0022390 A1* | 2/2004 | McDonald | H04L 9/083 380/277 |
| 2004/0044273 A1 | 3/2004 | Keith et al. | |
| 2004/0128535 A1 | 7/2004 | Cheng | |
| 2004/0158350 A1 | 8/2004 | Ostergaard et al. | |
| 2004/0267413 A1 | 12/2004 | Keber | |
| 2006/0037080 A1 | 2/2006 | Maloof | |
| 2006/0038818 A1 | 2/2006 | Steele | |
| 2006/0187060 A1 | 8/2006 | Colby | |
| 2006/0187061 A1 | 8/2006 | Colby | |
| 2006/0265751 A1 | 11/2006 | Cosquer et al. | |
| 2007/0136607 A1 | 6/2007 | Launchbury et al. | |
| 2007/0261112 A1 | 11/2007 | Todd et al. | |
| 2007/0266433 A1 | 11/2007 | Moore | |
| 2008/0098479 A1 | 4/2008 | O'Rourke et al. | |
| 2008/0119958 A1 | 5/2008 | Bear et al. | |
| 2008/0148398 A1 | 6/2008 | Mezack et al. | |
| 2008/0220740 A1 | 9/2008 | Shatzkamer et al. | |
| 2008/0244008 A1* | 10/2008 | Wilkinson | H04L 67/28 709/205 |
| 2008/0276317 A1 | 11/2008 | Chandola et al. | |
| 2008/0279387 A1 | 11/2008 | Gassoway | |
| 2008/0294019 A1 | 11/2008 | Tran | |
| 2008/0307526 A1 | 12/2008 | Chung et al. | |
| 2008/0319591 A1 | 12/2008 | Markiton et al. | |
| 2009/0021394 A1 | 1/2009 | Coughlin | |
| 2009/0028141 A1 | 1/2009 | Vu Duong et al. | |
| 2009/0062623 A1 | 3/2009 | Cohen et al. | |
| 2009/0066521 A1 | 3/2009 | Atlas et al. | |
| 2009/0067923 A1 | 3/2009 | Whitford | |
| 2009/0077666 A1 | 3/2009 | Chen et al. | |
| 2009/0157057 A1 | 6/2009 | Ferren et al. | |
| 2009/0167531 A1 | 7/2009 | Ferguson | |
| 2009/0254973 A1 | 10/2009 | Kwan | |
| 2009/0254992 A1 | 10/2009 | Schultz et al. | |
| 2009/0287706 A1 | 11/2009 | Bourges-Waldegg et al. | |
| 2010/0007489 A1 | 1/2010 | Misra et al. | |
| 2010/0066509 A1 | 3/2010 | Okuizumi et al. | |
| 2010/0183211 A1 | 7/2010 | Meetz et al. | |
| 2010/0201489 A1 | 8/2010 | Griffin | |
| 2010/0246827 A1* | 9/2010 | Lauter | G06F 21/6209 380/278 |
| 2010/0286572 A1 | 11/2010 | Moersdorf et al. | |
| 2011/0179492 A1 | 7/2011 | Markopoulou et al. | |
| 2011/0291803 A1 | 12/2011 | Bajic et al. | |
| 2011/0299420 A1 | 12/2011 | Waggener et al. | |
| 2012/0005755 A1 | 1/2012 | Kitazawa et al. | |
| 2012/0024889 A1 | 2/2012 | Robertson et al. | |
| 2012/0110328 A1* | 5/2012 | Pate | G06F 21/6218 713/165 |
| 2012/0167210 A1 | 6/2012 | Garcia et al. | |
| 2012/0278889 A1 | 11/2012 | El-Moussa | |
| 2012/0324568 A1 | 12/2012 | Wyatt et al. | |
| 2013/0046696 A1* | 2/2013 | Radhakrishnan | G06Q 20/32 705/65 |
| 2013/0046987 A1* | 2/2013 | Radhakrishnan | H04L 63/105 713/172 |
| 2013/0074186 A1 | 3/2013 | Muttik | |
| 2013/0104238 A1 | 4/2013 | Balson et al. | |
| 2013/0111036 A1 | 5/2013 | Ozawa et al. | |
| 2013/0195326 A1 | 8/2013 | Bear et al. | |
| 2013/0247205 A1 | 9/2013 | Schrecker et al. | |
| 2013/0298243 A1 | 11/2013 | Kumar et al. | |
| 2013/0340084 A1 | 12/2013 | Schrecker et al. | |
| 2013/0347094 A1 | 12/2013 | Bettini et al. | |
| 2014/0105573 A1 | 4/2014 | Hanckmann et al. | |
| 2014/0108474 A1* | 4/2014 | David | G06F 17/30 707/827 |
| 2014/0115707 A1 | 4/2014 | Bailey, Jr. | |
| 2014/0122370 A1 | 5/2014 | Jamal et al. | |
| 2014/0136846 A1 | 5/2014 | Kitze | |
| 2014/0137257 A1 | 5/2014 | Martinez et al. | |
| 2014/0153478 A1 | 6/2014 | Kazmi et al. | |
| 2014/0157405 A1 | 6/2014 | Joll et al. | |
| 2014/0163640 A1 | 6/2014 | Edgerton et al. | |
| 2014/0181267 A1 | 6/2014 | Watdkins et al. | |
| 2014/0181973 A1 | 6/2014 | Lee et al. | |
| 2014/0189861 A1 | 7/2014 | Gupta et al. | |
| 2014/0189873 A1 | 7/2014 | Elder et al. | |
| 2014/0201374 A1 | 7/2014 | Ashwood-Smith et al. | |
| 2014/0201836 A1 | 7/2014 | Amsler | |
| 2014/0219096 A1 | 8/2014 | Rabie et al. | |
| 2014/0222813 A1 | 8/2014 | Yang et al. | |
| 2014/0229739 A1 | 8/2014 | Roth et al. | |
| 2014/0237599 A1 | 8/2014 | Gertner et al. | |
| 2014/0259170 A1 | 9/2014 | Amsler | |
| 2014/0317261 A1 | 10/2014 | Shatzkamer et al. | |
| 2014/0317293 A1 | 10/2014 | Shatzkamer | |
| 2014/0325231 A1* | 10/2014 | Hook | H04L 9/088 713/171 |
| 2014/0343967 A1 | 11/2014 | Baker | |
| 2015/0019710 A1 | 1/2015 | Shaashua et al. | |
| 2015/0033340 A1 | 1/2015 | Giokas | |
| 2015/0061867 A1 | 3/2015 | Engelhard et al. | |
| 2015/0074807 A1 | 3/2015 | Turbin | |
| 2015/0082308 A1 | 3/2015 | Kiess et al. | |
| 2015/0088791 A1 | 3/2015 | Lin et al. | |
| 2015/0096024 A1 | 4/2015 | Haq et al. | |
| 2015/0163242 A1 | 6/2015 | Laidlaw et al. | |
| 2015/0178469 A1 | 6/2015 | Park et al. | |
| 2015/0227964 A1 | 8/2015 | Yan et al. | |
| 2015/0283036 A1 | 10/2015 | Aggarwal et al. | |
| 2015/0288541 A1 | 10/2015 | Fargano et al. | |
| 2015/0288767 A1 | 10/2015 | Fargano et al. | |
| 2015/0317169 A1 | 11/2015 | Sinha et al. | |
| 2015/0326535 A1 | 11/2015 | Rao et al. | |
| 2015/0326587 A1 | 11/2015 | Vissamsetty et al. | |
| 2015/0326588 A1 | 11/2015 | Vissamsetty et al. | |
| 2015/0333979 A1 | 11/2015 | Schwengler et al. | |
| 2015/0356451 A1 | 12/2015 | Gupta et al. | |

(56) References Cited

U.S. PATENT DOCUMENTS

| | | |
|---|---|---|
| 2015/0381423 A1 | 12/2015 | Xiang |
| 2015/0381649 A1 | 12/2015 | Schultz et al. |
| 2016/0006642 A1 | 1/2016 | Chang et al. |
| 2016/0014147 A1 | 1/2016 | Zoldi et al. |
| 2016/0050161 A1 | 2/2016 | Da et al. |
| 2016/0057234 A1 | 2/2016 | Parikh et al. |
| 2016/0065596 A1 | 3/2016 | Baliga et al. |
| 2016/0154960 A1 | 6/2016 | Sharma et al. |
| 2016/0156644 A1 | 6/2016 | Wang et al. |
| 2016/0156656 A1 | 6/2016 | Boggs et al. |
| 2016/0180042 A1 | 6/2016 | Menon et al. |
| 2016/0182379 A1 | 6/2016 | Mehra et al. |
| 2016/0205106 A1 | 7/2016 | Yacoub et al. |
| 2016/0218875 A1* | 7/2016 | Le Saint ............... H04L 9/0825 |
| 2016/0241660 A1 | 8/2016 | Nhu |
| 2016/0248805 A1 | 8/2016 | Burns et al. |
| 2016/0301704 A1 | 10/2016 | Hassanzadeh et al. |
| 2016/0301709 A1 | 10/2016 | Hassanzadeh et al. |
| 2016/0344587 A1 | 11/2016 | Hoffmann |
| 2016/0350539 A1 | 12/2016 | Oberheide et al. |
| 2016/0350846 A1 | 12/2016 | Dintenfass et al. |
| 2016/0352732 A1 | 12/2016 | Bamasag et al. |
| 2016/0364553 A1 | 12/2016 | Smith |
| 2017/0063893 A1 | 3/2017 | Franc et al. |
| 2017/0093915 A1 | 3/2017 | Ellis et al. |
| 2017/0149804 A1 | 5/2017 | Kolbitsch et al. |
| 2017/0228651 A1 | 8/2017 | Yamamoto |
| 2017/0264597 A1 | 9/2017 | Pizot et al. |
| 2017/0310485 A1 | 10/2017 | Robbins et al. |
| 2017/0318033 A1 | 11/2017 | Holland et al. |
| 2017/0366571 A1 | 12/2017 | Boyer |
| 2017/0373835 A1 | 12/2017 | Yamamoto |
| 2017/0374084 A1 | 12/2017 | Inoue et al. |
| 2018/0078213 A1 | 3/2018 | Kataoka et al. |
| 2018/0078452 A1 | 3/2018 | Kataoka et al. |
| 2018/0083988 A1 | 3/2018 | Kataoka et al. |
| 2018/0212768 A1 | 7/2018 | Kawashima et al. |
| 2018/0212941 A1 | 7/2018 | Yamamoto et al. |
| 2018/0337958 A1 | 11/2018 | Nagarkar |
| 2019/0052652 A1 | 2/2019 | Takahashi et al. |
| 2019/0075455 A1 | 3/2019 | Coulier |
| 2019/0156934 A1 | 5/2019 | Kataoka |
| 2019/0370384 A1 | 12/2019 | Dalek et al. |
| 2020/0177613 A1 | 6/2020 | Nilangekar et al. |

FOREIGN PATENT DOCUMENTS

| | | |
|---|---|---|
| JP | 2000000232 A | 1/2000 |
| JP | 2002143097 A | 5/2002 |
| JP | 2003242124 A | 8/2003 |
| JP | 2005217808 A | 8/2005 |
| JP | 2007318745 A | 12/2007 |
| JP | 2008049602 A | 3/2008 |
| JP | 2008167979 A | 7/2008 |
| JP | 2009075695 A | 4/2009 |
| JP | 2011060288 A | 3/2011 |
| JP | 2011095824 A | 5/2011 |
| JP | 2014515538 A | 6/2014 |
| JP | 2014126916 A | 7/2014 |
| JP | 2015012492 A | 1/2015 |
| JP | WO2015190446 A1 | 4/2017 |
| JP | 2018148267 A | 9/2018 |
| KR | 1020080046779 A | 5/2008 |
| WO | WO2008117544 A1 | 10/2008 |
| WO | WO2010103800 A | 9/2010 |
| WO | 2015190446 A1 | 12/2015 |

OTHER PUBLICATIONS

Lorch et al., 2004 IEEE International Symposium on Cluster Computing and the Grid, "A Hardware-secured Credential Repository for Grid PKIs", pp. 640-647 (Year: 2004).*

Auto-WEKA webpage printed regarding algorithms (2 pages) (Chris Thornton et al.) Feb. 17, 2015.

Ayat, N.E.; Cheriet, M.; Suen, C.Y.; "Automatic Model Selection for the optimization of SVM Kernels," Mar. 21, 2005 (35 pages).

Brodley, Carla, E., "Addressing the Selective Superiority Problem: Automatic Algorithm/Model Class Selection," (1993) (8 pages).

Chapelle, Olivier; Vapnik, Vladimir; Bousquet, Olivier; Mukherjee, Sayan; "Choosing Multiple Parameters for Support Vector Machines," *Machine Learning*, 46, 131-159, 2002 © 2002 Kluwer Academic Publishers (29 pages).

Lee, Jen-Hao and Lin, Chih-Jen, "Automatic Model Selection for Support Vector Machines, pp. 1-16" (2000).

Smith, Michael R.; Mitchell, Logan; Giraud-Carrier, Christophe; Martinez, Tony; "Recommending Learning Algorithms and Their Associated Hyperparameters," Jul. 7, 2014 (2 pages).

Thornton, Chris. Thesis: "Auto-WEKA: Combined Selection and Hyperparameter Optimization of Supervised Machine Learning Algorithms," Submitted to the University of British Columbia, Mar. 2014 (75 pages).

Thornton, Chris; Hutter, Frank; Hoos, Holger H.; Leyton-Brown, Kevin. "Auto-WEKA: Combined Selection and Hyperparameter Optimization of Classification Algorithms," Mar. 2013 (9 pages).

Wolinski, Christophe; Kuchcinski, Krzysztof. "Automatic Selection of Application-Specific Reconfigurable Extensions." *Design, Automation & Test in Europe Conference* (Date 2008). Mar. 2008, Munich, Germany, pp. 1214-1219 (7 pages).

Workshop Handout edited by Joaquin Vanschoren, Pavel Brazdil, Carlos Soares and Lars Kotthoff, "Meta-Learning and Algorithm Selection Workshop at ECAI 2014," MetaSel 2014, Aug. 19, 2014 (66 pages).

H. Larochelle et al. "An empirical evaluation of deep architectures on problems with many factors of variation" ACM ICML '07, p. 473-480 (8 pgs).

J. Bergstra et al. "Random Search for Hyper-Parameter Optimization" Journal of Machine Learning Research 13 (2012), p. 281-305 (25 pgs).

Wikipedia—anonymous—https://en.wikipedia.org/wiki/Decision_tree (5 pgs).

Wikipedia—anonymous—https://en.wikipedia.org/wiki/Support_vector_machine(16 pgs).

Wikipedia—anonymous—https://en.wikipedia.org/wiki/K-nearest_neighbors_algorithm (11 pgs).

Wikipedia—anonymous—https://en.wikipedia.org/wiki/Gradient_boosting (8 pgs).

Wikipedia—anonymous—https://en.wikipedia.org/wiki/Naive_Bayes_classifier (10 pgs).

Wikipedia—anonymous—https://en.wikipedia.org/wiki/Bootstrap_aggregating (3 pgs).

Wikipedia—anonymous—https://en.wikipedia.org/wiki/Logistic_regression (14 pgs).

Wikipedia—anonymous—https://en.wikipedia.org/wiki/AdaBoost (12 pgs).

Kaggle—https://www.kaggle.com/wiki/Home (2 pgs.).

Wikipedia—anonymous—TLS: Transport Layer Security Protoco—Webpage https://en.wikipedia.org/wiki/Transport_Layer_security (35 pgs/).

NIST—National Institute of Standards and Techology, US Department of Commerce "Computer Security Resource Center" AES Algorithm With Galois Counter Mode of Operation. Webpage https://csrc.nist.gov/projects/block-cipher-techniques/bcm (3 pgs.).

Moriarty, et al. PKI Certificate—PKS #12: Personal Information Exchange Syntax v1.1—Webpage https://tools.ietf.org/html/rfc7292 (30 pgs.).

ITU—International Telecommunication Union—Open Systems Interconnection—X.509: Information Technology—Public-key and attribute framework certificate—Webpage http://www.itu.int/rec/T-REC-X.509/enn (2 pgs.).

Groves, M., Sakai-Kasahara Key Encryption (SAKKE)—Internet Engineering Task Force dated Feb. 2012—Webpage https://tools.ietf.org/html/rfc6508 (22 pgs.)

Barbosa, L. et al.—SK-KEM: An Identity-Based Kem, Algorithm standardized in IEEE—Webpage http://grouper.ieee.org/groups/1363/IBC/submissions/Barbosa-SK-KEM-2006-06.pdf (20 pgs.).

(56) References Cited

OTHER PUBLICATIONS

Boyen-X, et al—Identity-Based Cryptography Standard (IBCS) #1: Supersingular Curve Implementations of the BF and BB1 Cryptosystems, dated Dec. 2007—Webpage https://tools.ietf.org/html/rfc5091 (64 pgs.).
An Amazon.com company @ Alexa—Webpage: https://www.alexa.com/siteinfo (5 pgs.).
Stouffer, K. et al.—"The National Institute of Standards & Technology(NIST) Industrial Control System (ICS) security guide" dated May 2015 (247 pgs.).
"Website Traffic, Statistics and Analytics @ Alexa," an Amazon.com company, 5 pages—Webpage: https://www.alexa.com/siteinfo.
Chih-Fong et al., Intrusion Detection by Machine Learning: A Review: dated 2009; pp. 11994-12000 (7 pages.).
Soldo, Fabio, Anh Le, and Athina Markopoulou. "Predictive blacklisting as an implicit recommendation system." INFOCOM, 2010 Proceedings IEEE. IEEE, 2010. (Year: 2010), 9 pages.
Kataoka et al., "Mining Muscle Use Data for Fatigue Reduction in IndyCar", MIT Sloan Sports Analytics Conference. Mar. 4, 2017 [retrieved Oct. 9, 2018]. Retrieved from the Internet, entire document http://www.sloansportsconference.com/wp-content/uploads/2017/02/1622.pdf.
Kegelman, et al., "Insights into vehicle trajectories at the handling limits: analyzing open data from race car drivers; Taylor & Francis, Vehicle System Dynamics" dated Nov. 3, 2016 (18 pgs.).
Theodosis, P. et al., "Nonlinear Optimization of a Racing Line for an Autonomous Racecar Using Professional Driving Techniques", dated Oct. 2012, 7 pages, Citation and abstract, retrieved from the web at: https://www.researchgate.net/publication/267650184.
Tulabandhula et al., "Tire Changes, Fresh Air, and Yellow Flags: Challenges in Predictive Analytics for Professional Racing" MIT, dated Jun. 2014 (16 pages.).
Takagahara et al., "hitoe—" A Wearable Sensor Developed through Cross-industrial Collaboration, NTT Technical Review, dated Sep. 4, 2014 (5 pages.).
Lee et al., "Development of a Novel Tympanic Temperature Monitoring System for GT Car Racing Athletes," World Congress on Medical Physics and Biomedical Engineering, May 26-31, 2012, Beijing, China, Abstract Only, pp. 2062-2065, dated 2013, (3 pages.)—retrieved from the web at: https://link.springer.com/chapter/10.1007/978-3-642-29305-4_541.
NTT Innovation Institute, Inc., Global Cyber Threat Intelligence by Kenji Takahashi, Jun. 8 2016, retrieved on Aug. 16, 2017, retrieved from the Internet, entire document https://www.slideshare.net/ntti3/global-cyber-threat-intelligence.
How to handle Imbalanced Classification Problems in machine learning? In: Analytics Vidhya. Mar. 17, 2017 (Mar. 17, 2017) Retrieved on Aug. 2, 2019 (Aug. 2, 2019), entire document https://www.analyticsvidhya.com/blog/2017/03/imbalanced-classification-problem/.
Yen et al., "Cluster-based under-sampling approaches for imbalanced data distributions." In: Expert Systems with Applications. Apr. 2009 (Apr. 2009) Retrieved on Aug. 2, 2019 (Aug. 2, 2019), entire document http://citeseemist.psu.edu/viewdoc/download?doi=10.1.1.454.35308,rep=rep1&type=pdf.
Chawla et al., "SMOTE: synthetic minority over-sampling technique." In: Journal of artificial intelligence research. Jun. 2, 2002 (Jun. 2, 2002) Retrieved on Aug. 2, 2019 (Aug. 2, 2019), entire document https://www.jairorg/index.php/jaidarticle/download/10302J24590.
Malik et al. "Automatic training data cleaning for text classification." In: 2011 IEEE 11th international conference on data mining workshops. Dec. 11, 2011 (Dec. 11, 2011) Retrieved on Aug. 2, 2019 (Aug. 2, 2019), entire document http://wwwl.cs.columbia.edu/-hhm2104/papers/atdc.pdf.
Mozer et al., "Skeletonization: A Technique for Trimming the Fat from a Network via Relevance Assessment", NIPS'88: Proceedings of the 1st International Conference on Neural Information Processing Systems, published Jan. 1988, pp. 107-115 (9 pages).

Cun et al., "Optimal Brain Damage". AT&T Bell Laboratories, Holmdel, N. J. 07733. Abstract. 8 pages.
Hassibi et al., "Second order derivatives for network pruning: Optimal Brain Surgeon", Department of Electrical Engineering, Stanford University, Stanford, CA 94305, 8 pages.
Reed et al., "Pruning Algorithms—A Survey", IEEE Transactions of Neural Networks, vol. 4, No. 5, Sep. 1993, 8 pages.
Steven A. Janowsky, "Pruning versus clipping in neural networks", Department of Physics, Harvard University, Cambridge, Massachusetts 02138 (Received Nov. 30, 1988), 4 pages.
Han et al., "Learning both Weights and Connections for Efficient Neural Networks", Stanford University, 9 pages.
Sze et al., "Efficient Processing of Deep Neural Networks A Tutorial and Survey", IEEE, Aug. 13, 2017, 32 pages.
Arora et al., "Stronger Generalization Bounds for Deep Nets via Compression Approach", Proceedings of the 35th Internationals Conference on Machine Learning, Stockholm, Sweden, PMLR 80, 2018, 10 pages.
Tanaka et al., "From deep learning to mechanistic understanding neuroscience: the structure of retinal prediction", 33rd Conference on Neural Information Processing Systems (NeurIPS 2019), Vancouver, Canada, 11 pages.
Frankle et al., "The Lottery Ticket Hypothesis: Finding Sparse, Trainable Neural Networks", Published as conference paper at ICLR 2019, MIT CSAIL, 42 pages.
Frankle et al., "Stabilizing Lottery Ticket Hypothesis", MIT CSAIL, University of Cambridge Element AI and University of Toronto Vector Institute, Jul. 20, 2020, 13 pages.
Morcos et al., "One ticket to win them all: generalizing lottery ticket initialization across datasets and optimizers", Facebook AI Research, 33rd Conference on Neural Information Processing Systems (NeurIPS 2019), Vancouver, Canada, 11 pages.
Lee et al., "SNIP: Single-Shot Network Pruning Based on Connection Sensitivity", University of Oxford, Published as a conference paper at ICLR 2019, 15 pages.
Wang et al., "Picking Winning Tickets Before Training by Preserving Gradient Flow", Published as a conference paper at ICLR 2020, University of Toronto, Vector Institute, 11 pages.
Iandola et al., "Squeezenet: Alexnet-Level Accuracy With 50x Fewer Parameters and <0.5MB Model Size", Under review as a conference paper at ICLR 2017, DeepScale* & UC Berkeley Stanford University, 13 pages.
Howard et al., "MobileNets: Efficient Convolutional Neural Networks for Mobile Vision Applications", Google Inc., Apr. 17, 2017, 9 pages.
Prabhu et al., "Deep Expander Networks: Efficient Deep Networks from Graph Theory", Center for Visual Information Technology, Kohli Center on Intelligent Systems, IIIT Hyderabad, India, 16 pages.
Jaderberg et al., "Speeding up Convolutional Neural Networks with Low Rank Expansions", Department of Engineering Science University of Oxford, Oxford, UK, 13 pages.
Novikov et al., "Tensorizing Neural Networks", INRIA, Sierra project-team, Paris, France; Skolkovo Institute of Science and Technology, National Research University Higher School of Economics, 4Institute of Numerical Mathematics of the Russian Academy of Sciences, Moscow, Russia, 9 pages.
Bellec et al., "Deep Rewiring: Training Very Sparse Deep NetWorks", Published as a conference paper at ICLR 2018, Institute for Theoretical Computer Science, Graz University of Technology, Austria, 24 pages.
Mocanu et al., "Scalable training of artificial neural networks with adaptive sparse connectivity inspired by network science", Nature Communications, 2018, 12 pages.
Gale et al., "The State of Sparsity in Deep Neural Networks", This work was completed as part of the Google AI Residency Google Brain and DeepMind, Feb. 25, 2019, 15 pages.
Blalock et al., "What is the State of Neural Network Pruning?", MIT CSAIL, Cambridge, MA, USA. Proceedings of the 3rd MLSys Conference, Austin, TX, USA, 2020, Mar. 6, 2020, 18 pages.
Sejun Park*, Jaeho Lee*, Sangwoo Mo, and Jinwoo Shin. Lookahead: A far-sighted alternative of magnitude-based pruning. In International Conference on Learning Representations, 2020, 20 pages.

(56) References Cited

OTHER PUBLICATIONS

Ehud D Karnin. A simple procedure for pruning back-propagation trained neural networks. IEEE transactions on neural networks, 1(2):239-242, 1990, 4 pages.

Pavlo Molchanov, Stephen Tyree, Tero Karras, Timo Aila, and Jan Kautz. Pruning convolutional neural networks for resource efficient inference. arXiv preprint arXiv:1611.06440, 2016, 17 pages.

Pavlo Molchanov, Arun Mallya, Stephen Tyree, Iuri Frosio, and Jan Kautz. Importance estimation for neural network pruning. In Proceedings of the IEEE Conference on Computer Vision and Pattern Recognition, pp. 11264-11272, 2019, 9 pages.

Yiwen Guo, Anbang Yao, and Yurong Chen. Dynamic network surgery for efficient DNNs. In Advances in neural information processing systems, pp. 1379-1387, 2016, 9 pages.

Xin Dong, Shangyu Chen, and Sinno Pan. Learning to prune deep neural networks via layer-wise optimal brain surgeon. In Advances in Neural Information Processing Systems, pp. 4857-4867, 2017, 11 pages.

Ruichi Yu, Ang Li, Chun-Fu Chen, Jui-Hsin Lai, Vlad I Morariu, Xintong Han, Mingfei Gao, Ching-Yung Lin, and Larry S Davis. Nisp: Pruning networks using neuron importance score propagation. InProceedings of the IEEE Conference on Computer Vision and Pattern Recognition, pp. 9194-9203,2018, 10 pages.

Zhuang Liu, Mingjie Sun, Tinghui Zhou, Gao Huang, and Trevor Darrell. Rethinking the value of network pruning. In International Conference on Learning Representations, 2019, 21 pages.

Namhoon Lee, Thalaiyasingam Ajanthan, Stephen Gould, and Philip H. S. Torr. A signal propagation perspective for pruning neural networks at initialization. In International Conference on Learning Representations, 2020, 16 pages.

Wenyuan Zeng and Raquel Urtasun. Mlprune: Multi-layer pruning for automated neural network compression. 2018, 12 pages.

Hesham Mostafa and Xin Wang. Parameter efficient training of deep convolutional neural networks by dynamic sparse reparameterization. In Proceedings of the 36th International Conference on Machine Learning, vol. 97 of Proceedings of Machine Learning Research, pp. 4646-4655. PMLR, 2019, 10 pages.

Xavier Glorot and Yoshua Bengio. Understanding the difficulty of training deep feedforward neural networks. In Proceedings of the thirteenth international conference on artificial intelligence and statistics, pp. 249-256, 2010, 8 pages.

Kaiming He, Xiangyu Zhang, Shaoqing Ren, and Jian Sun. Deep residual learning for image recognition. In Proceedings of the IEEE conference on computer vision and pattern recognition, pp. 770-778, 2016, 9 pages.

Kedar Dhamdhere, Mukund Sundararajan, and Qiqi Yan. How important is a neuron. In International Conference on Learning Representations, 2019, 15 pages.

Sebastian Bach, Alexander Binder, Grégoire Montavon, Frederick Klauschen, Klaus-Robert Müller, and Wojciech Samek. On pixel-wise explanations for non-linear classifier decisions by layer-wise relevance propagation. PloS one, 10(7), 2015, 46 pages.

Seul-Ki Yeom, Philipp Seegerer, Sebastian Lapuschkin, Simon Wiedemann, Klaus-Robert Müller, and Wojciech Samek. Pruning by explaining: A novel criterion for deep neural network pruning. arXiv preprint arXiv:1912.08881, 2019.

Hattie Zhou, Janice Lan, Rosanne Liu, and Jason Yosinski. Deconstructing lottery tickets: Zeros, signs, and the supermask. In Advances in Neural Information Processing Systems, pp. 3592-3602, 2019, 14 pages.

Hattie Zhou, Janice Lan, Rosanne Liu, and Jason Yosinski. Deconstructing lottery tickets: Zeros, signs, and the supermask. In Advances in Neural Information Processing Systems, pp. 3592-3602, 2019, 11 pages.

Haoran You, Chaojian Li, Pengfei Xu, Yonggan Fu, Yue Wang, Xiaohan Chen, Richard G. Baraniuk, Zhangyang Wang, and Yingyan Lin. Drawing early-bird tickets: Toward more efficient training of deep networks. In International Conference on Learning Representations, 2020, 13 pages.

Jonathan Frankle, Gintare Karolina Dziugaite, Daniel M Roy, and Michael Carbin. Linear mode connectivity and the lottery ticket hypothesis. arXiv preprint arXiv:1912.05671, 20190, 30 pages.

Haonan Yu, Sergey Edunov, Yuandong Tian, and Ari S. Morcos. Playing the lottery with rewards and multiple languages: lottery tickets in rl and nlp. In International Conference on Learning Representations, 2020, 12 pages.

Simon S Du, Wei Hu, and Jason D Lee. Algorithmic regularization in learning deep homogeneous models: Layers are automatically balanced. In Advances in Neural Information Processing Systems, pp. 384-395. 20180, 12 pages.

Stijn Verdenius, Maarten Stol, and Patrick Forré. Pruning via iterative ranking of sensitivity statistics. arXiv preprint arXiv:2006.00896, 2020, 25 pages.

Moshou et al., "Dynamic muscle fatigue detection using self-organizing maps", Applied Soft Computing, Elsevier, Amsterdam, NL, vol. 5, No. 4, Jul. 1, 2005 (Jul. 1, 2005), pp. 391-398, 8 pages, XP027669999, ISSN: 1568-4946 [retrieved on Jul. 1, 2005].

Zhang et al., "Automated Detection of Driver Fatigue Based on Entropy and Complexity Measures", IEEE Transactions on Intelligent Transportation Systems, IEEE, Piscataway, NJ, USA, vol. 15, No. 1, Feb. 1, 2014 (Feb. 1, 2014), pp. 168-177, XP011538702, ISSN: 1524-9050, DOI: 10.1109/TITS.2013.2275192 [retrieved on Jan. 30, 2014].

Crammer K., et al., "Online Passive-Aggressive Algorithms," Journal of Machine Learning Research, Mar. 2006, vol. 7, pp. 551-585.

Extended European Search Report for European Application No. 18849363.9, dated Mar. 26, 2021, 06 Pages.

Geurts P., et al., "Extremely Randomized Trees," Machine Learning, Springer Science + Business Media Inc., Published Online on Mar. 2, 2006, vol. 63, No. 1, 40 Pages.

International Preliminary Report on Patentability for International Application No. PCT/US2017/038619, dated Jan. 3, 2019, 05 Pages.

International Preliminary Report on Patentability for International Application No. PCT/US2017/038801, dated Jan. 3, 2019, 09 Pages.

International Preliminary Report on Patentability for International Application No. PCT/US2017/039043, dated Jan. 3, 2019, 09 Pages.

International Preliminary Report on Patentability for International Application No. PCT/US2017/052277, dated Oct. 5, 2018, 15 Pages.

International Preliminary Report on Patentability for International Application No. PCT/US2017/052290, dated Mar. 28, 2019, 06 Pages.

International Preliminary Report on Patentability for International Application No. PCT/US2017/052297, dated Mar. 28, 2019, 10 Pages.

International Preliminary Report on Patentability for International Application No. PCT/US2018/014871, dated Aug. 1, 2019, 06 Pages.

International Preliminary Report on Patentability for International Application No. PCT/US2018/014875, dated Aug. 1, 2019, 7 Pages.

International Preliminary Report on Patentability for International Application No. PCT/US2018/047615, dated Mar. 5, 2020, 07 Pages.

International Search Report and Written Opinion for International Application No. PCT/US2017/038619, dated Sep. 1, 2017, 06 Pages.

International Search Report and Written Opinion for International Application No. PCT/US2017/038801, dated Sep. 1, 2017, 10 Pages.

International Search Report and Written Opinion for International Application No. PCT/US2017/039043, dated Sep. 15, 2017, 10 Pages.

International Search Report and Written Opinion for International Application No. PCT/US2017/052277, dated Nov. 30, 2017, 07 Pages.

International Search Report and Written Opinion for International Application No. PCT/US2017/052290, dated Dec. 11, 2017, 07 Pages.

(56) References Cited

OTHER PUBLICATIONS

International Search Report and Written Opinion for International Application No. PCT/US2017/052297, dated Nov. 20, 2017, 11 Pages.
International Search Report and Written Opinion for International Application No. PCT/US2018/014871, dated Apr. 26, 2018, 07 Pages.
International Search Report and Written Opinion for International Application No. PCT/US2018/014875, dated Apr. 4, 2018, 8 Pages.
International Search Report and Written Opinion for International Application No. PCT/US2018/047615, dated Oct. 26, 2018, 08 Pages.
"Kickstarter," Memo Box: Ultimate Aide Memoire for Your Pills and Vitamins, 18 Pages, [Retrieved on Sep. 18, 2017] Retrieved from URL: https://kickstarter.com/project/661527809/memo-box-smart-companion-for-your-pills-and-vitamin.
Office Action for European Patent Application No. 18849363.9, dated Feb. 3, 2023, 6 Pages.
Office Action for Japanese Patent Application No. 20180567679, dated Jan. 16, 2023, 2 Pages.
"Pillbox by Tricella," The Pillbox just got smarter, 10 pages, [Retrieved on Sep. 27, 2017] Retrieved from URL: http://www.tricella.com/.
Robyn, "Tricella Introduces Smart Pillbox," [Retrieved on Sep. 27, 2017] Retrieved from URL: https://macsources.com/tricella-introduces-smart-pillbox/.
Theodosis P., et al., "Nonlinear Optimization of a Racing Line for an Autonomous Racecar Using Professional Driving Techniques," Abstract Only, Oct. 2012, 3 Pages. Retrieved from URL: https://www.researchgate.net/publication/267650184_Nonlinear_Optimization_of_a_Racing_Line_for_an_Autonomous_Racecar_Using_Professional_Driving_Techniques_dated_October_2012.
Webpage: https://Youtube.com/watch?v= KzJ3dHNNIUA (web-link only).
Webpage: https://Youtube.com/watch?v=e6B77i6Mdkw (web-link only).
Webpage: "Memo Box, the smart pillbox that reminds you to tae your medication," 2014, 7 Pages, Retrieved from URL: https://www.gizmag.com/memo-box-medication-reminder/34579/.
Webpage: "Remo Cam," 2016, 10 Pages, Retrieved from URL: https://remocam.com/tag/ces2016/.

\* cited by examiner

DIGITAL CREDENTIAL ISSUING SYSTEM AND METHOD

FIELD

The disclosure relates generally to a system and method for generating and issuing a digital credential.

BACKGROUND

In today's digital world, it is often very desirable to be able to generate and issue a credential to an entity so that the entity can prove its authority to perform an action. As shown in FIG. 1, a typical credential issuing system 100 may have a client/entity 102 that is seeking to have a credential issued to it, a credential issuer 104 that manages the issuance of the credentials and issues digital secret data for clients that proves the clients' authority and a policy database 106 that the credential issuer 104 uses to determine whether or not to issue a new credential to the entity 102 based on a policy stored in the policy database 106. In one example, the credential Issuer 104 may be a known Certificate Authority in a public key infrastructure (PM) systems and a customer portal that issues an application programming interface (API) key for a cloud service. As shown in FIG. 1, the process for issuing a credential may include four steps: 1) a request for the issuance of a credential by a client 102 to the credential issuer 104; 2) the credential issuer 104 may lookup a policy for the particular client in the policy database 106; 3) the policy database may provide the policy back to the credential issuer; and 4) the credential issuer 104, using the retrieved policy, determine whether to issue the credential for the client 102 or not and communicates with the client 102. These steps are performed interactively meaning that the credential issuer 104 has to interact with each client seeking a credential.

In the typical system shown in FIG. 1, the credential issuer 104 usually stores/contains/maintains its master secret key that the credential issuer 104 uses to generate the new credentials that it issues to each client based on the policy. The fact that the credential issuer stores its master secret key is problematic since a data breach of the credential issuer can be a critical security problem. Furthermore, it is difficult to prepare a replacement or redundant spare of credential issuer 104 due to the necessity for the credential issuer 104 to have access to the master secret key.

In the typical system 100 shown in FIG. 1, the interactive communication is essential for security because the Credential Issuer 104 needs to bind the message requesting the credential (step 1) and the message providing the credential (step 4). Usually it is done by checking knowledge of one-time secret string that is issued in response to the message in step (1) and that checking means that interactive communications is required. However, the interactive communication between the clients 102 and the credential issuer 104 risks the security of the credential issuer 104 for several reasons. First, data breaches from potential vulnerability in the software that processes data from clients 102 exposes the credential issuer to security risks. Second, denial of service attacks from massive number of requests from malicious (or spoofed) clients can pose a serious risk to the security of credential issuer 104. These security risks to the credential issuer 140 are serious technical problems with current digital credential issuing systems and methods. Thus, it is desirable to provide a digital credential issuing system and method that provides a technical solution to the above technical problem and such as technical solution is described below.

DETAILED DESCRIPTION OF ONE OR MORE EMBODIMENTS

The disclosure is particularly applicable to a digital credential issuing system and method that may be used in connection with (or integrated into) an enterprise infrastructure with internet of things (IoT) devices security system and it is in this context that the disclosure will be described below. It will be appreciated, however, that the digital credential issuing system and method has greater utility because: 1) the digital credential issuing system and method may be a standalone and independent system that acts as a digital credential issuer for a plurality of third party systems and entities; 2) the digital credential issuing system and method may be used to issue a digital credential for any system in which it is desirable to be able to securely issue a credential to a new entity; and 3) the digital credential issuing system and method may be implemented in other manners that those described below and it is understood that the digital credential issuing system and method may be implemented in different manners that are within the scope of the disclosure.

Figure 1:
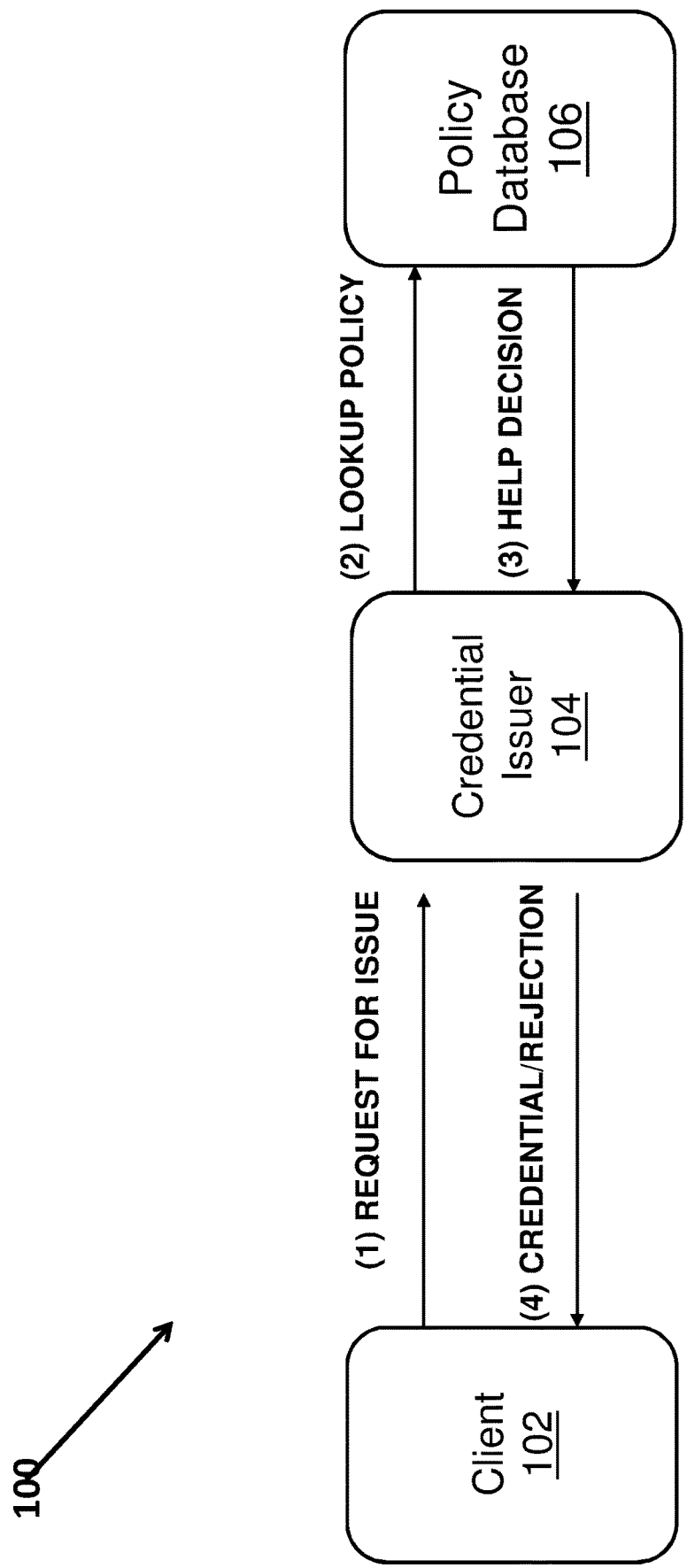
FIG. 1 illustrates a typical system for digital credential issuance.
Figure 2:
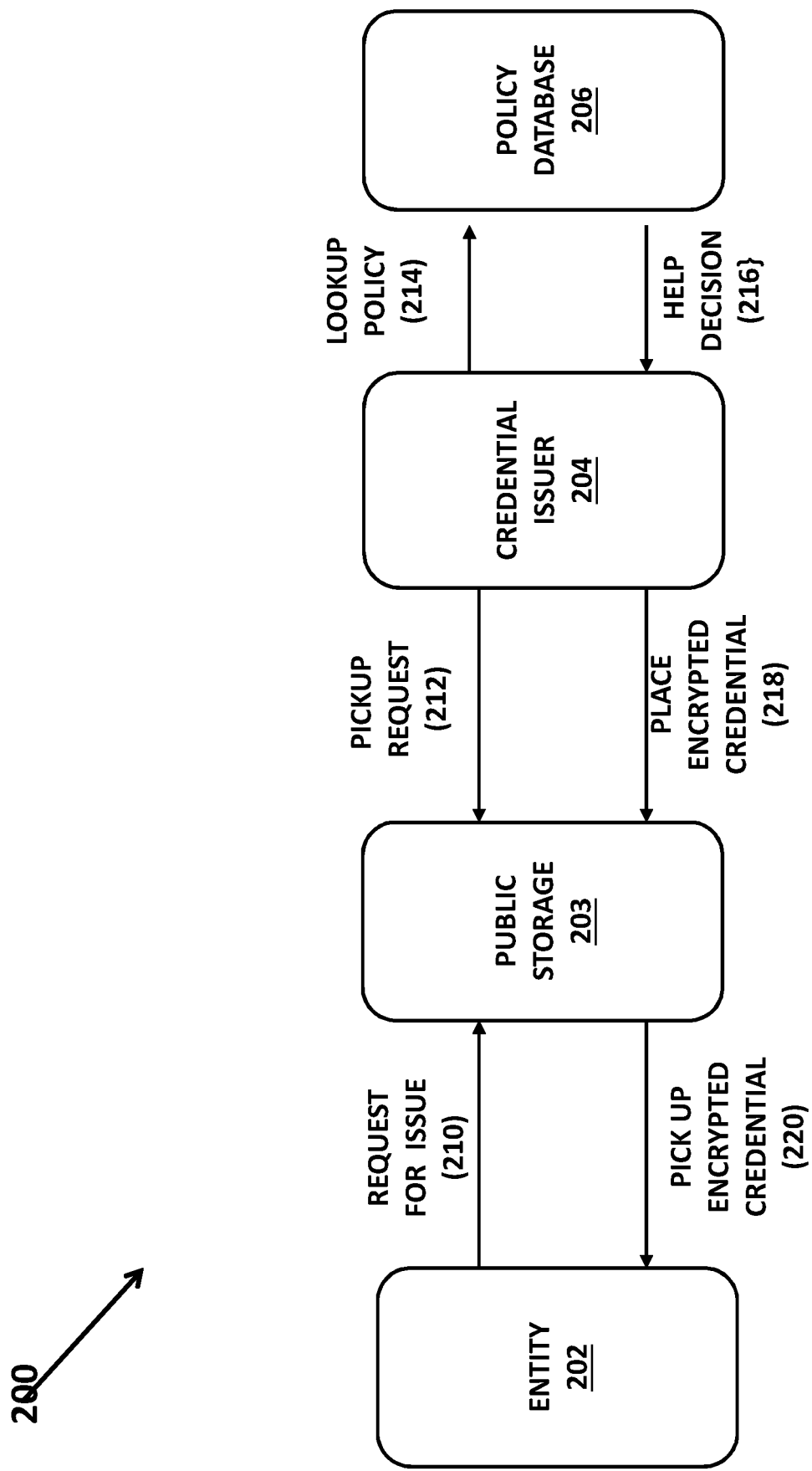
FIG. 2 illustrates a digital credential issuance system and method.

FIG. 2 illustrates a digital credential issuance system 200 and method. The system 200 may have one or more entities 202 that each wish to secure a new digital credential and public storage 203 that is used as an intermediary between each entity 202 and a credential issuer 204 that eliminates the interactive communications between the entity 202 and the credential issuer 204 during the issuance of a digital credential. The system 200 may also include a policy database 206 that stores a plurality of security policies wherein each policy/rule may provide a rule about whether or not a new credential should be issued to a particular entity.

Each entity 202 may be a person (using some type of device or computer system), a computer system, a device, an IoT device or service, etc. that is capable of requesting a digital credential, capable of retrieving an encrypted credential from the public storage 203, capable of decrypting the retrieved encrypted credential and capable of using the newly issued digital credential or communicating the newly issued digital credential. Each entity 202 may use an application, such as for example a browser application, a mobile application or other application to interface with the public storage 203 and indirectly with the credential issuer 204.

The public storage 203 may be implemented in a number of different manners so that the public storage may receive each request for a new credential from each entity 202, may provide storage for each encrypted credential generated by the credential issuer 204 and may provide access to a particular encrypted credential (issued for a particular entity) by the particular entity 202. The security of each new credential is ensured by securing each new credential using a process such as encryption. For example, the public storage 203 may implemented using a shared storage for workgroups using an operating system, such as for example Linux, Unix, Windows, MacOS, and so on. Alternatively, the public storage 203 may be implemented using public cloud storage such as Google Drive, Drop Box, One Drive and so on. The public storage 203 alternatively may be implemented using a known internet of Things (IoT) messaging services such as MQTT server, MQTT server cluster, CoAP server and the like. The public storage also may be implemented using peer to peer (P2P) storage system such as Bit torrent and so on. The public storage also may be implemented using a bulletin board system (BBS) on the web such as Reddit, 2-channel and so on. The public storage also may be implemented using social netowrk services such as Facebook, Twitter and so on. The public storage also may be implemented using chat services such as ICQ, IRC and so on. The public storage also may be implemented using netnews or other public bulletin services. The public storage also may be implemented using any memory device in a public space.

The public storage 203 also may be implemented using newspaper articles, advertisements and the like. For example, the newspaper article, advertisement or other written article may be used as the public storage 203 and the credential issuer 204 may publish an encrypted credential in/on the written article, such as a newspaper. The entity 202 may then retrieve the encrypted credential from the written article and obtain the credential by decrypting the credential using the decryption key held or accessible by the entity 202.

The credential issuer 204 may be implemented using hardware, software or a combination of hardware and software. When the credential issuer 204 is implemented in hardware, it may be a hardware device, a specialized piece of hardware, a server, appliance, etc. that performs the operations of the credential issuer 204 as described below. When the credential issuer 204 is implemented in software, it may be a plurality of lines of computer code/instructions that may be executed by a processor to perform the operations of the credential issuer 204 as described below. When the credential issuer 204 is implemented in software and hardware, it may be a plurality of lines of computer code/instructions stored on a hardware device, such as a server computer, a microcontroller, field programmable gate array and the like that has a processing device, such as a processor, CPU, etc. and the plurality of lines of computer code/instructions are executed by the processing device to perform the operations of the credential issuer 204 as described below. The credential issuer 204 may have a plurality of rules wherein each rule uses a piece of information retrieved from the policy database to determine whether or not to issue a new credential to each entity 202. For example, each rule may consist of a device identifier (ID) for a particular device, such as a IoT device or other device and a function indentifier (ID) paired or associated with each other. The credential issuer 204 may, based on the rule for the particular device, issue a credential that authorizes the particular function id for each device id that is paired with the particular function id in the rule. Further details of the credential issuer 204 are provided in FIG. 3 and described below.

The policy database 206 may be implemented in using a hardware storage device or a software based storage device and the database may be a relational database system, a flat file storage system and the like. The policy database may store a plurality of security policies/rules. Each security policy/rule may be a rule that specifies, for a particular entity, whether that particular entity can be issued a new credential based on certain characteristics of the entity. For example, in a system with IoT device in which a credential may be issued for a new IoT device, the security policy/rule may provide that a certain type of IoT device, such as an environmental sensor or a device owned by a particular user may be issued a new credential.

For example, for a network of monitoring cameras, a security backoffice wants access to the cameras only from authorized tablets that is managed by the office so that a third party is not able to hack into the camera and its data. In this example, each camera is programmed with the Policy that the network node with the Credential for Monitoring function can access to. Then, the credential for monitoring may be issued to the authorized tablets. In this example, if the system uses a system of cloud storage that stores images from the cameras, security operators would like to allow access to the cloud storage from authorized cameras only. Thus, each instance of a cloud storage element is programmed with the Policy that the network node with the Credential for Camera function can access the cloud storage element. The Credential is then issued to the authorized cameras. As another example, if the security backoffice would like to restrict the use of images from Camara to the authorized employee only, then the Credential Issuer can require user authentication everytime when issuing the Credential to the authorized tablets.

The secure credential issuing process using the system 200 may include a process of an entity requesting a new credential submitting a credential request (210) which is communicated to the public storage 203. The credential issuer 204 may then pickup the new credential request (212). Thus, in this process, the public storage 203 is in between the entity 202 and the credential issuer 204 so that there is no interactive communication with entities 202 and the credential issuer 204 thus reducing the security risk detailed above with typical systems. Once the credential issuer 204 receives a new request, the credential issuer 204 may lookup a security policy/rule for the particular entity that requested the new credential from the policy database 206 (214). The policy database 206 may return the applicable security policy/rule that helps the credential issuer determine whether or not to issue the new credential (216). If the credential issuer determines that the new credential should be issued, the credential issuer generates a new credential, encrypt the new credential and places the encrypted new credential into the public storage 203 (218). The method may use various different encryption schemes/methods. For example, the method may use public key encryption in which the credential issuer may retrieve the public encryption key for the particular entity and the entity may then decrypt the new credential using the private key of the entity. As an illustrative example, the known AES algorithm with the Galois counter mode of operation may be used (further details of which may be found at http://csrc.nist.gov/groups/ST/toolkit/BCM/documents/proposedmodes/gcm/gcm-spec.pdf which is incorporated herein by reference), although the system and method may be implemented using any known or yet to be developed encryption algorithm.

In the method, the entity 202 may retrieve the encrypted credential from the public storage 203 (220) and then decrypt the new credential. The method may use various different encryption schemes/methods in which the credential issuer is able to encrypt the new credential and each entity is able to decrypt the encrypted credentials only when it is encrypted for that particular entity. For example, the method may use public key encryption in which the credential issuer may retrieve the public encryption key for the particular entity and the entity may then decrypt the new credential using the private key of the entity to ensure that only the entity is able to decrypt the credential.

Unlike the typical digital credential process described above, the disclosed process eliminates the direct interaction between the entity and the credential issuer to reduce the security risks and encrypts the new credential. Furthermore, instead of binding messages like the typical system, the disclosed system encrypts the new credential so that it may be stored/uploaded/sent to public storage.

Figure 3:
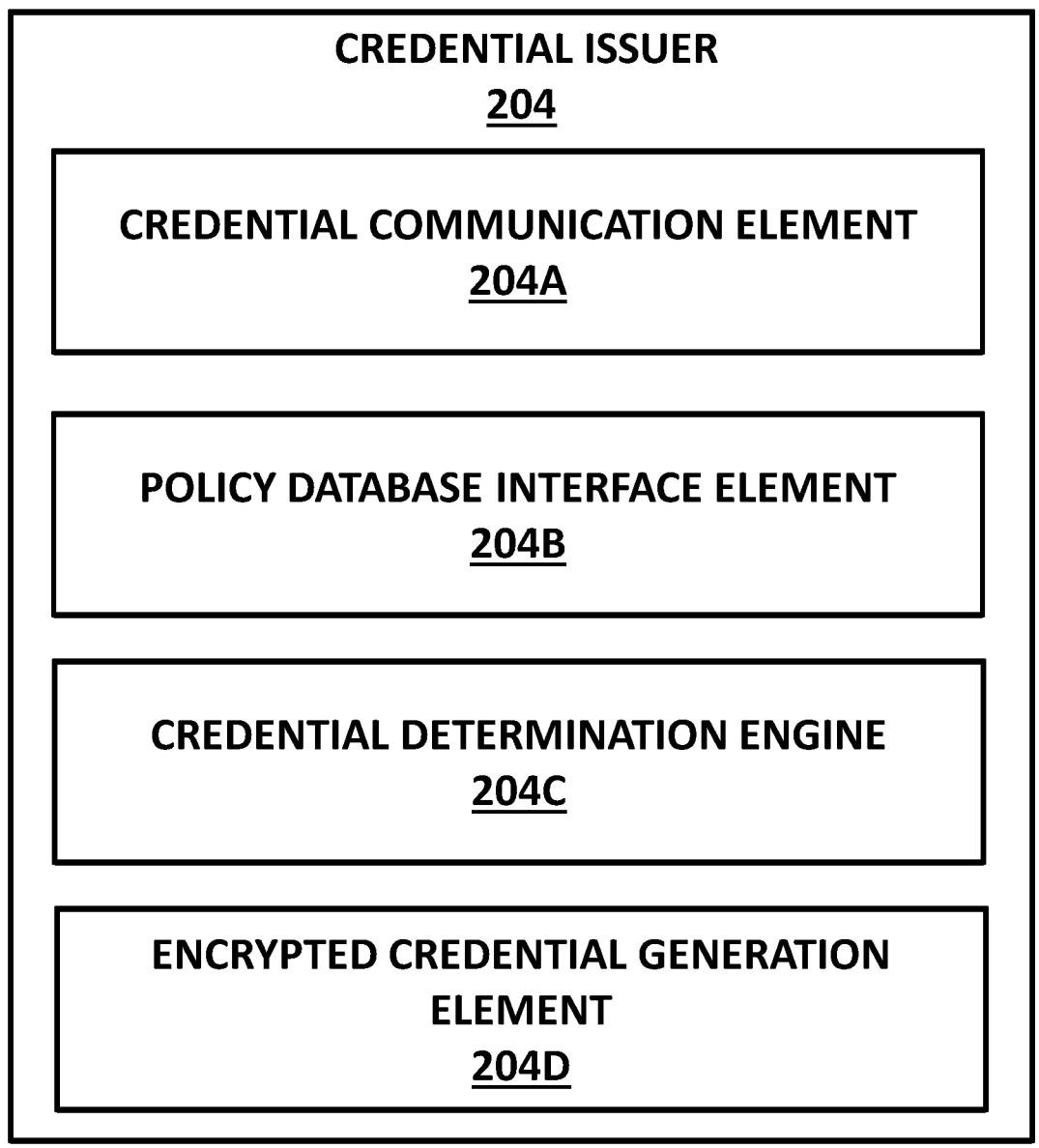
FIG. 3 illustrates more details of the credential issuer that is part of the digital credential issuance system 200 in FIG. 2.

FIG. 3 illustrates more details of the credential issuer 204 that is part of the digital credential issuance system 200 in FIG. 2. Like the credential issuer 204, each of the elements of the credential issuer shown in FIG. 3 may be implemented in hardware or software or a combination of hardware and software. The credential issuer 204 may include a credential communication element 204A, a policy database interface element 204B, a credential determining engine 204C and an encrypted credential generation element 204D. The credential communication element 204A may set-up, manage and communicate with the public storage and the policy database using known data and communications protocols. The policy database interface element 204B may act as an interface, possibly using an API or other access mechanism, to retrieve a security policy/rule in response to each request for a new credential and to receive and process a retrieved security policy/rule. The credential determining engine 204C uses the retrieved policy/rule (and possibly other information) to determine whether or not to issue a new credential for a request by a particular entity. If the policy store/database 206 does not contain a policy that matches the entity 202 requesting a credential, then the system does not issue a credential to the entity. The encrypted credential generation element 204D generates a new credential (when authorized by the credential determining engine 204C) and then encrypts that new credential. The new encrypted credential may be known as a new secured credential.

Each credential may be generated is various manners. For example, to generate the credential, the credential issuer 204 may generate a PKCS#12 file that contains both a public key certificate and a private key. The PKCS#12 file is known in the art (further details of which may be found at—https://tools.ietf.org/html/rfc7292—that is incorporated herein by reference). To generate the file, the credential issuer may first generate a random number and pick a private key using the random number and then compute the public key that corresponds to the private key. The credential issuer 204 may then generate a X.509 certificate for the public key by signing the public key. The X.509 certificate is known in the art (further details of which may be found at—http://www.itu.int/rec/T-REC-X.509/en—that is incorporated herein by reference). The credential issuer 204 may then encode the private key to the X.509 standard file for the private key and may pack the two X.509 files into a PKCS#12 file using the container standard in PKCS#12. To sign the public key, the Credential Issuer 204 may have a component/module that has a function as a Certificate Authority in known PM. The component/module keeps the private key for the Certificate Authority, and it signes the public key for X.509 client certificates using the private key for the Certificate Authority.

In one embodiment, the encryption process may be performed in the following manner. Specifically, for each request for a new credential from a particular entity, the particular entity may generate a public key pair in a known manner and then may place the public key with Request for Issue for the credentials in the public storage 203. The credential Issuer 204 may then encrypt the newly generated credential using the public key and then place the credentials encrypted by the public key in the public storage 203. The entity 202 may then decrypts the encrypted credential using the private key which the entity created during the generation of the public key pair and holds.

In another embodiment, the encryption process may be performed in the following manner. In this embodiment, the certificate issuer 204 may generate a public key pair (both a public key and private key that are mathematically linked together) and publish the public key. Then, for each request, the particular entity 202 may generate a random string as a shared key. The particular entity may then put the shared key encrypted by Client Issuer's public key together with Request for Issue in public storage. The credential Issuer 204 may obtain/decrypt the shared key using its private key, generate the new credential, encrypt the new credential using the shared key and place the encrypted credential into the public storage. The entity may then decrypt the encrypted credential using the shared secret key.

In another embodiment, the encryption process may be performed in the following manner. In this embodiment, each entity 202 requesting a new credential may generate the request for the credential as described above and the request for the credential may further include an identity string for the entity, such as e-mail address, phone-number, SSN, account number, IMEI, IP address, hostname, and so on. The credential issuer 204 may then place credentials encrypted by an ID-based encryption algorithm, which uses the identity string of the entity in place of the public key of the entity. In one implementation, the known SAKKE algorithm (further details of which may be found at https://tools.ietf.org/html/rfc6508 that is incorporated herein by reference) may be used. Alternatively, the system may use a variant algorithm of the SAKKE algorithm, such as the SK-KEM algorithm standardized in IEEE (further details of which may be found at http://grouper.ieee.org/groups/1363/IBC/submissions/Barbosa-SK-KEM-2006-06.pdf that is incorporated herein by reference). Another alternative may be to use a Boneh-Franklin algorithm (further details of which may be found at https://tools.ietf.org/html/rfc5091 that is incorporated herein by reference) that is an ID-based encryption algorithm designed upon completely different mathematical mechanism than the SAKKE algorithm. For this embodiment, interoperatability is not necessarily important unlike typical use case of public key cryptographic algorithm. This embodiment is operable as long as the Entity and The Credential Issuer uses the same algorithm with the same parameter.

Once the credential is encrypted, the entity may then obtain a private key for the identity from a trusted authority of ID-based encryption system and the Client decrypts encrypted credential using the private key. The trusted authority issues private key for the identity string of each entity with verifying its authority. For example, if the identity string is an e-mail address, it may be verified by sending a random secret number (or any random string) to the e-mail address and requiring input the number back. Another example of identity is phone number, verified by an automatic voice call that tells the secret numbers.

In some embodiments, if the Public Storage 203 is writable to the public, the public key pair may not be secure. For example, malicious third party may overwrite the public key (or the encrypted shared key) to replace with the key generated by the malicious party which results in the malicious party obtaining the credential since Credential Issuer cannot distinguish the keys. However, if the system has some mechanism to authorize the public keys from each entity, then the embodiment using public key pairs will be secure. This may be accomplished, for example, using PM certificates as the public keys from each entity. If the embodiment with the shared key, if the system has a digital signature mechanism to the share keys from entities, then this embodiment will be secure by signing the shared keys on Public Storage.

In the process of digital credential issuing shown in FIG. 2, processes 210 and 212 may be omitted if the system has an external trigger to issue credentials. For example, the system may check the public storage 203 each house and issue credential every 1 hour. Alternatively, the system may issue credentials only when the Policy database 206 is updated. In the embodiments, previously issued credentials are stored in the public storage. As a result, the entities are able to obtain credentials without any trigger to the Credential Issuers.

Thus, the above disclosed embodiments of the digital credential issuing system addresses the technical problem of insecure digital credentials and the security risks associated with typical digital credential issuing system as described above. The disclosed digital credential issuing system provides technical solution to the problem by using the credential issuer, the public storage and the policy database and encryption and by using the digital credential issuing process described above.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A credential issuing system, comprising:
   public storage;
   a credential issuer coupled to the public storage to communicate credential information between the credential issuer and the public storage;
   an entity device coupled to the public storage but not coupled to the credential issuer, the credential issuer communicating the credential information only between the entity device and the public storage, the public storage being an intermediary between the entity device and the credential issuer without any communication between the entity device and the credential issuer;
   a policy store coupled to the credential issuer, the policy store having a plurality of security policy rules, wherein each security policy rule indicates whether a new credential is to be issued to a particular entity that uses the entity device by determining whether a device identifier and/or a function identifier for the entity device matches authorized device identifiers and/or function identifiers specific to the particular entity;
   wherein the credential issuer generates a secured new credential that is encrypted for the particular entity in response to a request for a new credential and uploads the secured new credential for the particular entity to the public storage; and
   the entity device having a processor and a memory that retrieves the secured new credential from the public storage and decrypts the secured new credential to provide the new credential to the particular entity without communication directly between the entity device and the credential issuer.

2. The system of claim 1, wherein the credential issuer retrieves a public key of a public key pair for the particular entity from the public storage and encrypts the new credential using the retrieved public key.

3. The system of claim 2, wherein the entity device decrypts the secured new credential using a secret key from the public key pair.

4. The system of claim 1, wherein the request for the new credential includes an identity of the particular entity and wherein the credential issuer encrypts the new credential using an ID-based encryption process on the identity to form the secured new credential.

5. The system of claim 4, wherein the entity device decrypts the secured new credential using a private key of the identity from a trusted source.

6. The system of claim 1, wherein the credential issuer generates a public key pair and encrypts the secured new credential using a shared key from the particular entity.

7. The system of claim 6, wherein the entity device generates the shared key, encrypts the shared key using the public key of the credential issuer and uploads the request for the new credential and the encrypted shared key to the public storage.

8. The system of claim 7, wherein the credential issuer decrypts the encrypted shared key using a private key of the public key pair to reveal the shared key.

9. The system of claim 1, wherein the public storage stores previously generated credentials for one or more particular entities and wherein the entity device accesses the public storage to retrieve a previously generated credential for the particular entity.

10. The system of claim 1, wherein the credential issuer retrieves the request for the new credential for the particular entity from the public storage and generates a credential element in response to the request for the new credential.

11. A method for issuing a credential, comprising:
generating, by a credential issuer, a new secured credential for a particular entity that is encrypted in response to a request for a new credential using a policy store, the policy store having a plurality of security policy rules, wherein each security policy rule indicates whether a new credential is to be issued to the particular entity by determining whether a device identifier and/or a function identifier for an entity device matches authorized device identifiers and/or function identifiers specific to the particular entity; and
uploading, by the credential issuer, the new secured credential to a public storage, the public storage being an intermediary between the entity device of the particular entity and the credential issuer without any communication between the entity device and the credential issuer, such that the entity device retrieves the new secured credential from the public storage and decrypts the secured new credential to provide the new credential to the particular entity without communication directly between the entity device and the credential issuer.

12. The method of claim 11, wherein encrypting the new credential further comprises retrieving a public key of a public key pair for the particular entity from the public storage and encrypting the new credential using the retrieved public key.

13. The method of claim 12 further comprising retrieving by the particular entity the secured new credential from the public storage and decrypting the secured new credential using a secret key from the public key pair.

14. The method of claim 11, wherein the request for the new credential includes an identity of the particular entity and wherein encrypting the new credential further comprises encrypting the new credential using an ID-based encryption process on the identity to form the secured new credential.

15. The method of claim 14 further comprising retrieving by the particular entity the secured new credential from the public storage and decrypting the secured new credential using a private key of the identity from a trusted source.

16. The method of claim 11, wherein encrypting the new credential further comprises generating a public key pair and encrypting the secured new credential using a shared key from the particular entity.

17. The method of claim 16 further comprising generating by the particular entity the shared key, encrypting the shared key using the public key of a credential element and uploading the request for the new credential and the encrypted shared key to the public storage.

18. The method of claim 17 further comprising decrypting by the credential element the encrypted shared key using a private key of the public key pair to reveal the shared key.

19. The method of claim 11 further comprising storing in the public storage previously generated credentials for one or more particular entities and retrieving, by the entity device, a previously generated credential for the particular entity.

20. The method of claim 11 further comprising retrieving the request for the new credential for the particular entity from the public storage.

* * * * *